United States Patent

Finkenzeller et al.

Patent Number: 4,555,794
Date of Patent: Nov. 26, 1985

[54] X-RAY FILM HOLDER

[75] Inventors: Johann Finkenzeller, Erlangen; Günter Hubert, Baiersdorf, both of Fed. Rep. of Germany

[73] Assignee: Siemens Aktiengesellschaft, Berlin and Munich, Fed. Rep. of Germany

[21] Appl. No.: 549,369

[22] Filed: Nov. 4, 1983

[30] Foreign Application Priority Data

Jul. 18, 1983 [DE] Fed. Rep. of Germany ....... 3242639

[51] Int. Cl.⁴ .............................................. G03B 11/00
[52] U.S. Cl. ..................................... 378/187; 378/185
[58] Field of Search .............................. 378/187, 185; 250/482.1

[56] References Cited

U.S. PATENT DOCUMENTS 3,860,826  1/1975  Somerset ............................ 378/187
4,063,102  12/1977  Ronci et al. ......................... 250/480

FOREIGN PATENT DOCUMENTS 2214613  10/1973  Fed. Rep. of Germany .
2438278   2/1975  Fed. Rep. of Germany .
1453048  10/1976  United Kingdom .

Primary Examiner—Richard L. Schilling
Attorney, Agent, or Firm—John Francis Moran

[57] ABSTRACT

An X-ray film holder is disclosed comprising a bottom (1) to receive both the X-ray film (6) and image intensifying screens (7, 8) placed against the film, and a lid (2) to close the holder. The bottom (1) and the lid (2) are provided on all sides with grooves (3) and projections (4) that fit into one another so that the lid (2) can slide with respect to the bottom (1) by means of the guide system thus formed, and is interlocked with the bottom (1) on all sides when in the closed position. A foam cushion (10), placed within a cover (9) made of airtight material, which extends roughly over the entire film surface, is connected to the lid (2) by means of the wall of the cover. The cover (9) and the lid (2) are provided with interconnecting openings (11, 12) for the evacuation of the interior of the cover. The holder can therefore be opened after it is evacuated.

2 Claims, 5 Drawing Figures

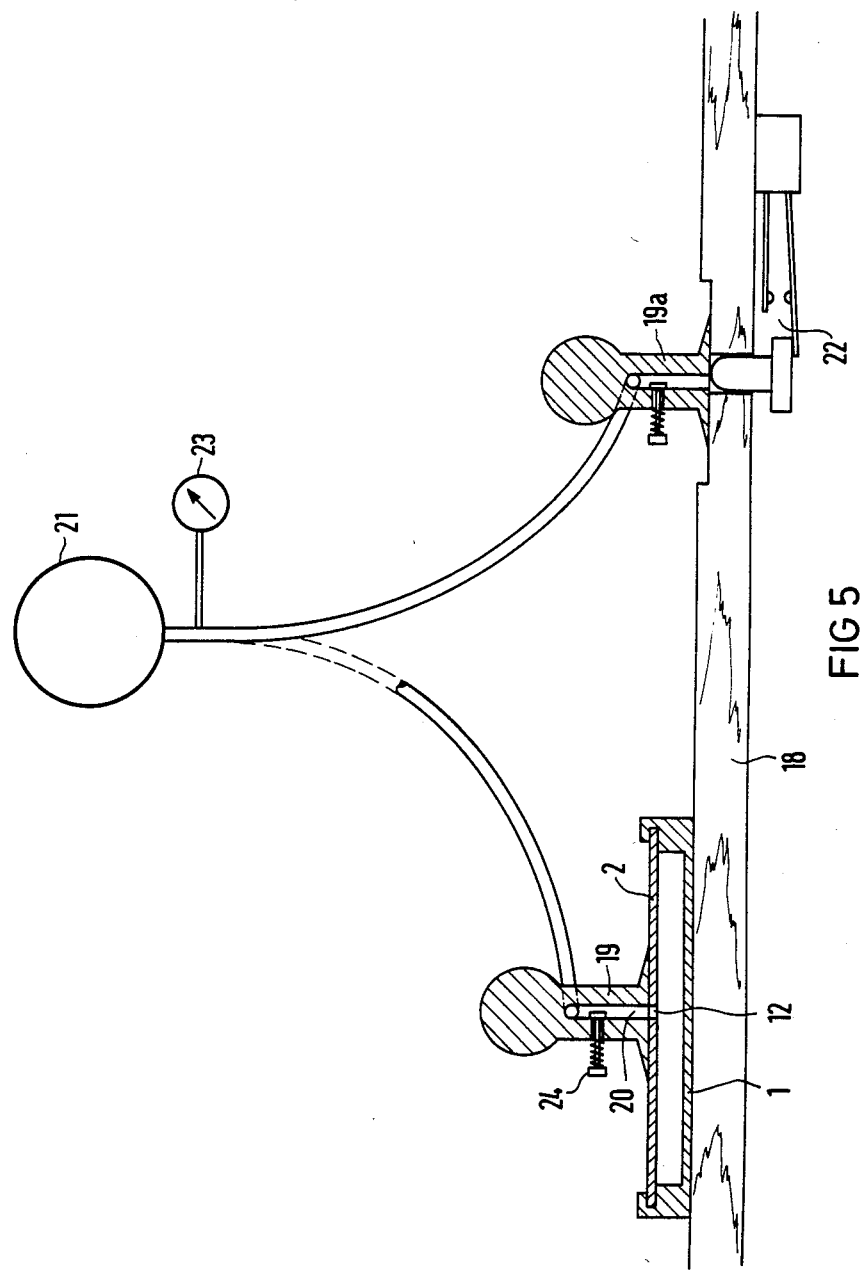

X-RAY FILM HOLDER

BACKGROUND OF THE INVENTION

The invention concerns an X-ray film holder or "cassette" having a bottom to receive the X-ray film and image intensifying screens placed against the film; a lid to close the holder; as well as a means for pressing the intensifying screens against the film.

One requirement for an X-ray film holder is that the intensifying screens lying in the holder be pressed firmly against the film. In the conventional holders, the bottom and the lid are hinged together. The pressure is exerted when the holder is closed, and an elastic material, such as foam rubber, provides tolerance compensation and a distribution of pressure over the entire surface of the film. In large holders, the bottom of the holder and the lid bend so much during this process, as a result of the great contact pressure resulting from the large surface, that it is impossible to ensure even pressing when this design is used.

An effective measure to avoid this disadvantage would be to provide even pressure over the entire surface by means of atmospheric pressure; in other words to evacuate the holder as disclosed in the German patent application 22 14 613. The seals required for such a holder, however, cannot maintain the vacuum long enough in practical operation. The holders would in each case have to be evacuated shortly before their use, which is troublesome and time-consuming.

SUMMARY OF THE INVENTION

The basic purpose of the invention is to create an X-ray film holder of the kind described above, in which the intensifying screens are pressed against the X-ray film with an even firm pressure and the operation is simple and time-saving.

This task is accomplished according to the invention by providing the bottom and the lid on all sides with grooves and projections that fit into one another in such a manner that, by means of the guide system thus formed, the lid can be slid or shifted with respect to the bottom and, in the closed position, is interlocked with the bottom on all sides. A foam cushion, placed in a cover made of airtight material and which extends roughly over the entire film surface, is connected to one part of the holder by means of the wall of the cover. The cover and the wall to which the cover is fastened are provided with interconnecting openings for the evacuation of the interior of the cover. When the interior of the cover is evacuated, the cover, with the foam cushion, shrinks and the holder can be opened. When the vacuum in the interior of the cover disappears, the foam cushion expands once again and presses the image intensifying screens evenly against the X-ray film. The interlocking connection between the bottom and the lid prevents any bending of the holder while this pressure is being applied.

A useful embodiment of the invention consists in having a spring-biased lever mounted on either the lid or the bottom of the holder (in particular the part opposite to the part in which an opening is provided) and which can be operated by the foam cushion. This lever prevents an unintentional opening of the holder.

The foregoing and other objects, features and advantages of the invention will be apparent from the following more particular description of the preferred embodiments of the invention, as illustrated in the accompanying drawings.

BRIEF DESCRIPTION OF THE DRAWINGS

FIG. 5 is a diagrammatical view of a system for the opening and closing of film holders according to FIGS. 1 to 4.

DESCRIPTION OF THE PREFERRED EMBODIMENTS

Figure 1:
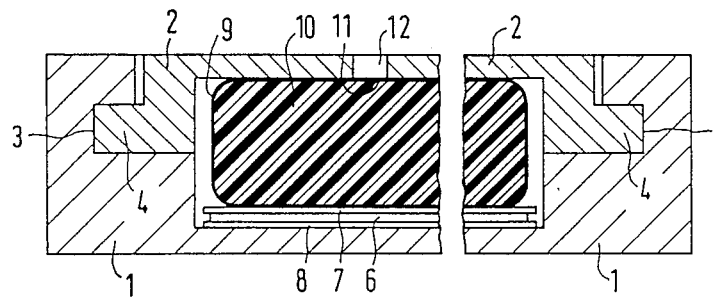
FIGS. 1 and 2 are transverse and longitudinal cross-sectional views, respectively, of an X-ray film holder in accordance with a preferred embodiment of the invention.
Figure 2:
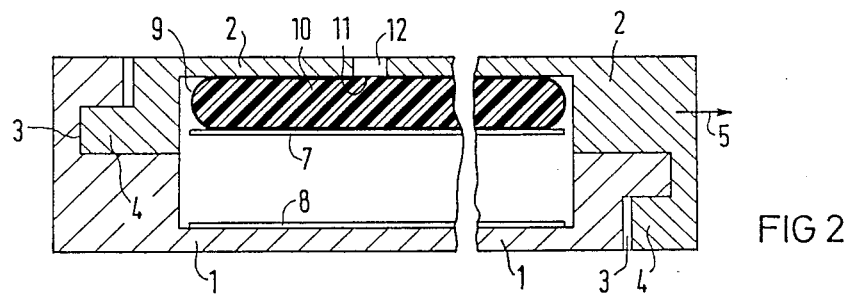

FIGS. 1 and 2 illustrate the bottom 1 and the lid 2 of an X-ray film holder according to a preferred embodiment of the present invention. As may be seen the bottom 1 is provided with grooves 3, and the lid 2 with projections 4, which interlock with one another when the holder is closed. Correspondingly, the closed holder that is shown in FIGS. 1 and 2 can be opened by pulling the cover 2 in the direction shown by the arrow 5. The grooves 3 and the projections 4 form a guide system which permits the lid 2 to be moved with respect to the bottom and ensures a connection between the bottom 1 and the lid 2 that interlocks on all sides when the holder is closed.

In the interior of the holder is an X-ray film 6, which lies between two image intensifying screens 7 and 8. The upper intensifying screen 7 is fastened to a cover 9 made of airtight material, which surrounds a foam cushion 10 and is fastened to the inside of the lid 2, for example, by means of an adhesive. The cover 9 with the foam cushion 10 extends roughly over the entire surface of the intensifying screens 7 and 8 and the X-ray film 6. The cover 9 and the lid 2 are provided with aligned, interconnecting openings 11, 12 to permit evacuation of the interior of the cover.

If the holder is to be opened, the air is evacuated from the interior of the cover 9 through the openings 11 and 12. As a result, the foam cushion 10 in the cover 9 is compressed, so that the distance between the intensifying screens 7 and 8 increases, as is shown in FIG. 2. For purposes of clarity, the X-ray film 6 is not shown in FIG. 2. After the evacuation of the interior of the cover 9, the holder can be opened, in order to exchange an exposed X-ray film for an unexposed one, by pulling the lid 2 in the direction of the arrow 5, and afterwards closed again by moving the lid 2 in the direction opposite to the arrow 5.

Figure 3:
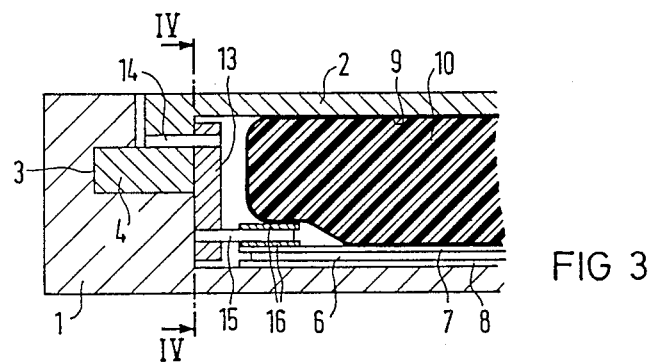
FIG. 3 is a partial sectional view of a variant of the X-ray film holder according to FIGS. 1 and 2.
Figure 4:
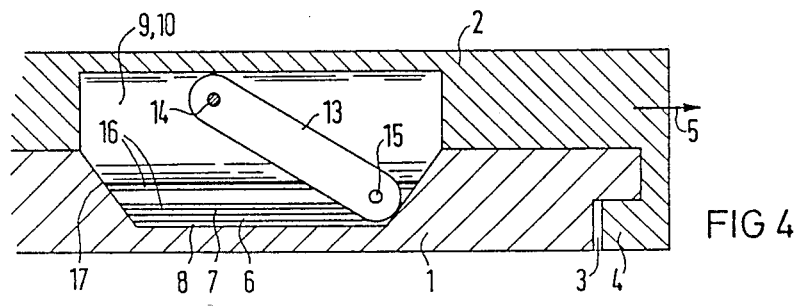
FIG. 4 is a sectional view taken along the line IV—IV in FIG. 3.

FIGS. 3 and 4 show a locking device for the holder when it is closed. This locking device consists of a lever 13, which is mounted so that it can swivel on an axle 14 in the lid 2 and is guided by a projection 15 between two strips 16. The strips 16 are ordinarily—that is, when the interior of the cover 9 is not evacuated—pressed against one another and against the intensifying screen 7 by the foam cushion 10, so that the lever 13 assumes the position shown in FIGS. 3 and 4. In this case it lies in a trapezoidal recess 17 in the bottom 1.

Accordingly, if the lid 2 is pulled in the direction of the arrow 5, the lever 13 comes up against the right-hand edge of the recess 17, as shown in FIG. 4, and prevents the holder from being opened. On the other hand, if the interior of the cover 9 is evacuated, so that it and the foam cushion 10 are compressed, then a spring (not shown), which moves the lever 13 in a counter-clockwise direction (in the sense shown in FIG. 4), can move the projection 15 so far upward that the lever 13 is no longer in contact with the right edge of the recess 17, and the holder can be opened.

FIG. 5 illustrates the use of the X-ray film holder according to FIGS. 1 to 4 on a base 18. To open the holder a suction cup 19 made of rubber is placed on the lid 2 of the holder in such a way that its aspirating hole 20 is aligned with the opening 12 in the lid 2. A suction pump 21 is in this case automatically turned on by a switch 22 when the suction cup 19 is removed from its storage position 19a and evacuates the interior of the cover 9 in the manner described. The holder can then be opened by pulling on the lid 2 with the aid of the suction cup 19. A manometer 23 indicates the pressure so that the user knows when the holder can be opened. Then the holder can be closed again. A hand-operated valve 24 makes it possible to release the vacuum, so that after the holder is closed, the suction cup 19 can be put back again in its storage position 19a.

There has thus been shown and described a novel X-ray film holder which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:
1. An x-ray film holder comprising:
   (a) a bottom member for receiving the x-ray film and associated, adjacent image intensifying screens;
   (b) a lid member for closing said holder, said lid member and said bottom member having mating grooves and projections on all sides thereof forming a guide system that permits said lid member to slide with respect to said bottom member, and to be interlocked with said bottom member on all sides when in a closed position; and
   (c) means, disposed between said film and said intensifying screens on one hand and one of said bottom and said lid members on the other, for pressing said intensifying screens against said film, said pressing means, including:
      (1) a foam cushion; and
      (2) an airtight cover surrounding said foam cushion having an external wall attached to one of said bottom and said lid members and extending over substantially the entire surface of said intensifying screens and said film, said cover and the wall of said one member to which said cover is attached having interconnecting openings to permit evacuation of the interior of said cover, and spring-biased lever means, swivally mounted on one of said members to which said cover is not attached and arranged to be operated by said pressing means, for preventing the opening of said lid member when said pressing means exerts a pressure on said intensifying screens and said film.
2. The X-ray film holder defined in claim 1, wherein said cover is attached to said lid member.

* * * * *